United States Patent
Sugauchi et al.

(10) Patent No.: US 7,987,258 B2
(45) Date of Patent: Jul. 26, 2011

(54) NETWORK MEASUREMENT CONFIGURATION APPARATUS

(75) Inventors: Kiminori Sugauchi, Yokohama (JP); Hiroshi Saito, Kawasaki (JP); Emiko Kobayashi, Kawasaki (JP); Minoru Koizumi, Yokohama (JP); Georg Carle, Tübingen (DE); Tanja Zseby, Berlin (DE); Sebastian Zander, Berlin (DE); Carsten Schmoll, Berlin (DE); Lutz Mark, Berlin (DE); Jens Tiemann, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 643 days.

(21) Appl. No.: 10/678,391

(22) Filed: Oct. 3, 2003

(65) Prior Publication Data

US 2005/0005004 A1  Jan. 6, 2005

(30) Foreign Application Priority Data

Oct. 3, 2002 (JP) ................................. 2002-291459

(51) Int. Cl.
*G06F 15/173* (2006.01)
(52) U.S. Cl. ......... 709/224; 709/223; 709/225; 709/226
(58) Field of Classification Search ........... 709/223–226
See application file for complete search history.

(56) References Cited

U.S. PATENT DOCUMENTS

| | | | |
|---|---|---|---|
| 6,223,222 B1 * | 4/2001 | Fijolek et al. | 709/227 |
| 6,278,694 B1 * | 8/2001 | Wolf et al. | 370/253 |
| 6,327,677 B1 * | 12/2001 | Garg et al. | 714/37 |
| 6,725,253 B1 * | 4/2004 | Okano et al. | 709/203 |
| 7,061,874 B2 * | 6/2006 | Merugu et al. | 370/255 |
| 7,284,051 B1 * | 10/2007 | Okano et al. | 709/226 |
| 7,363,367 B2 * | 4/2008 | Lloyd et al. | 709/224 |
| 2002/0128925 A1 * | 9/2002 | Angeles | 705/26 |
| 2003/0033395 A1 * | 2/2003 | Sato | 709/223 |
| 2003/0204579 A1 * | 10/2003 | Lutz | 709/223 |
| 2006/0116919 A1 * | 6/2006 | Homann et al. | 705/10 |

FOREIGN PATENT DOCUMENTS

| | | |
|---|---|---|
| JP | 11-088328 A | 3/1999 |
| JP | 2001-144761 A | 5/2001 |
| JP | 2002-016599 A | 1/2002 |

OTHER PUBLICATIONS

"Users Guide for Internetwork Performance Monitor, Software Release 2.4," Cisco Systems, Inc. San Jose CA (May 2000).
Zseby et al. "QoS Monitoring and Measurement Benchmarking," Information Society Technologies, Brussels, Belgium (Oct. 2002).
Japan Patent Office (JPO) office action for JPO patent application JP2002-291459 dated Jun. 12, 2007).

(Continued)

*Primary Examiner* — Aaron Strange
*Assistant Examiner* — Brian P. Whipple
(74) *Attorney, Agent, or Firm* — George B. F. Yee; Fountainhead Law Group PC

(57) ABSTRACT

An object of the present invention is to provide a network measurement configuration apparatus which selects an IP meter for measurement traffic of a network, and sets a measurement rule in the IP meter.

In order to achieve the above object, there is provided a network measurement configuration apparatus connected to a network having a plurality of measurement devices arranged therein, which measures traffic data of the network based on a measurement rule, comprising, a receiving means which receives a user request including path information and a measurement type, a measurement device selecting means which selects a measurement device responsible for a measurement based on the user request, and a measurement rule setting means which sets a measurement rule in the measurement device thus selected.

8 Claims, 10 Drawing Sheets

OTHER PUBLICATIONS

Brownlee, et al., Traffic Flow Measurement: Architecture, RFC 2722, IPPM, Internet Engineering Task Force, 1999.

Almes, et al., A One-way Delay Metric for IPPM, RFC 2679, IPPM, Internet Engineering Task Force, 1999.

Almes, et al., A One-way Packet Loss Metric for IPPM, RFC 2680, IPPM, Internet Engineering Task Force, 1999.

Japan Patent Office (JPO) office action for JPO patent application JP2002-291459 dated Jan. 19, 2007.

* cited by examiner

FIG.3

| | | | |
|---|---|---|---|
| REQUEST IDENTIFIER | 0001 | | |
| USER IDENTIFIER | USER A | | |
| MEASUREMENT RULE IDENTIFIER | MID0001 | | |
| QoS CALCULATION IDENTIFIER | SLA_USERA_0001 | | |
| START TIME | 10/3/02 10:00:00 | END TIME | 13/3/02 10:00:00 |
| REQUESTING STATUS | ON_GOING | | |

FIG.4

| MEASUREMENT TYPE (402) | NUMBER OF IP METERS TO BE USED (403) | IP METER TASK (404) | QoS SERVER TASK (405) |
|---|---|---|---|
| | 1 | VOLUME_CALC_ON_METER | NONE |
| | | PACKET_COPY, CRC_CONDENSE | VOLUME_CALCULATION |
| ONE WAY DELAY | 2 | PACKET_COPY, CRC_CONDENSE | DELAY_CALCULATION |
| RTT | 1-SENDER | VOLUME_CALC_ON_METER | NONE |
| | | PACKET_COPY, CRC_CONDENSE | RTT_CALCULATION |
| . . . | . . . | . . . | . . . |

| | | | | |
|---|---|---|---|---|
| 502 | IP METER IDENTIFIER | METER_01 | | |
| 503 | IP ADDRESS | aa.bb.cc.dd | | |
| 504 | PORT NUMBER | 2001 | | |
| 505 | MONITORING SEGMENT | a.a.a.0/24 | | |
| 506 | MEASUREMENT CHARACTERISTIC | VL_CALC_ON_METER, CRC_CONDENSE | | |
| 507 | TIME SYNCHRONISM | HIGH_RES | | |
| 508 | MAXIMUM NUMBER OF RULES | 100 | CURRENT NUMBER OF RULES | 50 |
| 510 | IP METER STATUS | NORMAL | | |
| 511 | LAST UPDATE DATE | 9/3/02 9:30:00 | | |

501

509

US 7,987,258 B2

NETWORK MEASUREMENT CONFIGURATION APPARATUS

This application claims Japanese Patent Applications No. 2002-291459 filed on Oct. 3, 2002. The entire contents of which are incorporated herein by reference for all purpose.

BACKGROUND OF THE INVENTION

The present invention relates to a network measurement configuration apparatus which selects, based on a user request, a meter for measurement traffic in a network, and sets a measurement rule on the IP meter thus selected.

As a means for measurement traffic characteristics in the network, such as transfer delay and packet loss, for example, it is known to carry out measurement by capturing data flowing through the network, utilizing a plurality of capturing devices (hereinafter referred to as "IP meters") arranged within the network, and by collecting the data thus captured by a measurement server.

In the IPPM (IP Performance Metrics) of IETF (The Internet Engineering Task Force), methods for calculating delay time, loss and the like of a packet flowing through the network, by use of IP meters disposed at two positions, are defined in RFC 2679 and RFC 2680.

In RFC 2722, measurement system architecture is defined, and a configuration of an administrative manager for setting a measurement rule, an IP meter and a reader for collecting information from the IP meter are defined therein. However, in the RFC 2722, it is not defined as to a method for selecting the IP meter on which the measurement rule is set.

SUMMARY OF THE INVENTION

Generally, a user reguest as to the measurement of traffic characteristics is, for example, a demand for measurement regarding an arbitrary network path between terminals, and a measurable point is not specified. Therefore, it is necessary to select an IP meter on which the measurement rule is set, in response to the user request.

However, in a large-scale network, plural types of IP meters exist and they are arranged at various positions. Since the IP meter varies in available types of measurement, performance and workload, according to an IP meter type, it is necessary to select an IP meter corresponding to the user request, considering the measurable point, available measurement types, workload and the like of each IP meter. Therefore, there has been a large burden on an administrative operator.

An object of the present invention is to provide a network measurement configuration apparatus which selects, based on a user request, an IP meter for measurement traffic in a network, and sets a measurement rule on the IP meter thus selected.

In order to solve the problem as described above, according to the present invention, there is provided a network measurement configuration apparatus connected to a network having a plurality of measurement devices arranged therein, which measures traffic data in the network based on a measurement rule, comprising, a receiving means which receives a user request including path information and a measurement type, a measurement device selecting means which selects a measurement device responsible for a measurement based on the user request, and a measurement rule setting means which sets a measurement rule in the measurement device thus selected.

Here, the network measurement configuration apparatus further comprising, a measurement device information storing means which stores a measurable traffic data type and a measurable network range in each of said plurality of measurement devices, wherein, said measurement device selecting means selects as a measurement device responsible for the measurement, a measurement device which includes in the measurable network range a measurable point obtained by path information included in the user request, and which is capable of measurement traffic data relating to the measurement type included in the user request.

BRIEF DESCRIPTION OF THE DRAWINGS

FIG. 3 is a diagram showing a data structure of a service management database 108a.

FIG. 4 is a diagram showing a data structure of a measurement characteristic database 108b.

FIG. 5 is a diagram showing a data structure of a meter information database 108c.

DETAILED DESCRIPTION OF THE PREFERRED EMBODIMENTS

Preferred embodiments of the present invention will be explained in detail with reference to the attached drawings.

Figure 1:
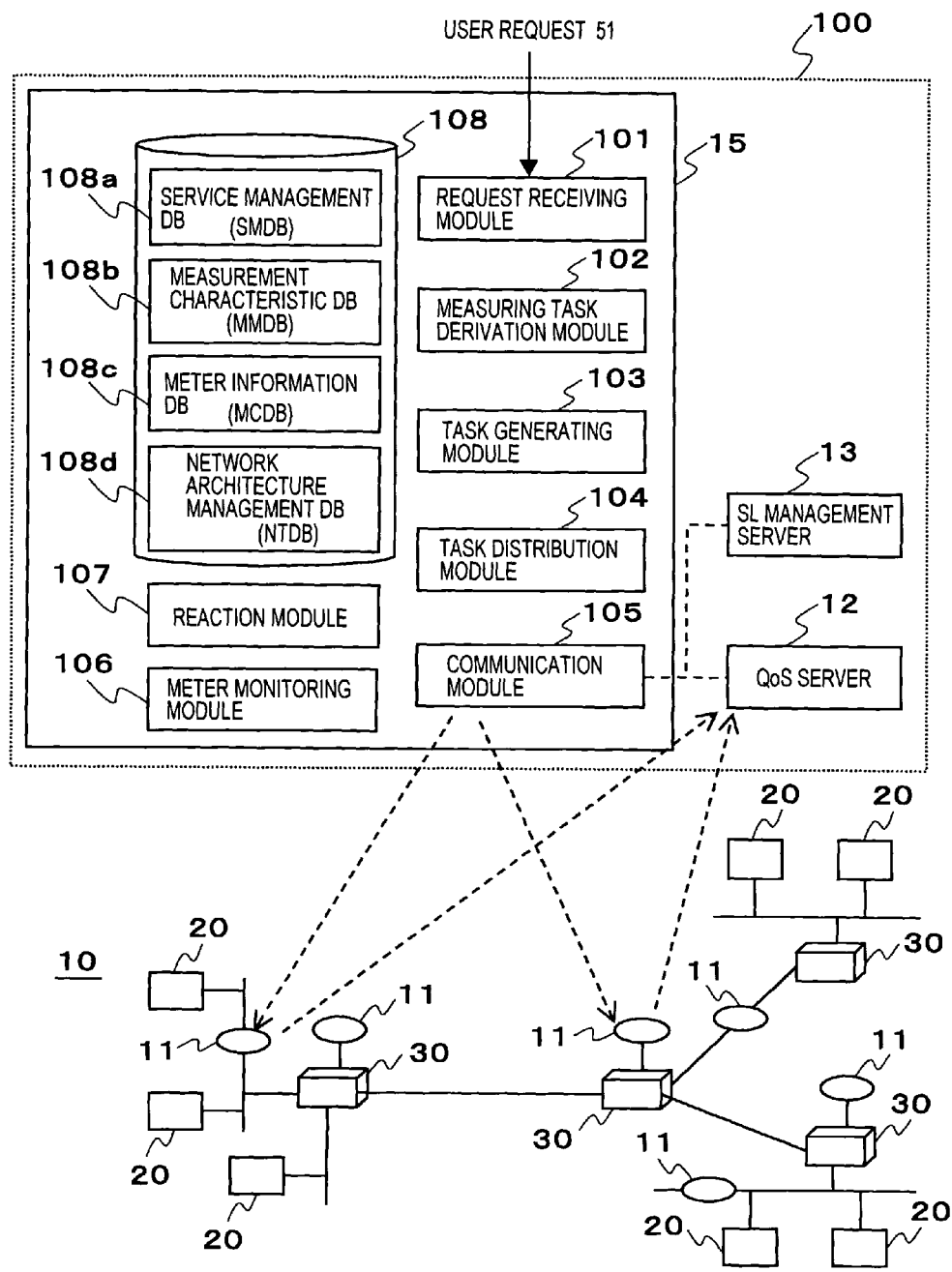
FIG. 1 is a block diagram showing a configuration of QoS analysis system 100 to which the present invention is applied and a network 10, which is targeted for measurement by the QoS analysis system 100.

FIG. 1 is a block diagram showing a configuration of QoS (Qualify of Service) analysis system 100 to which the present invention is applied and a network 10, which is targeted for measurement by the QoS analysis system 100.

The network 10 is configured by connecting network segments including terminals 20 via network devices 30 such as routers. In the network 10, a plurality of IP meters 11 are arranged for measurement traffic of the network 10. The IP meter 11 measures, according to a given measurement rule, a traffic regarding a service level, such as number, size and throughput of packets targeted for measurement. There are various IP meters, distributed broadly within the network 10, such as incorporated in the network device 30, or arranged independently.

A QoS Server 12, a service level management server 13 (referred to as "SL management server 13"), and a task distributor 15 functioning as a network measurement configuration apparatus are connected to the network 10. Those units constitute the QoS analysis system 100. The QoS analysis system 100 may be configured with a plurality of devices as shown in FIG. 1. Alternatively, it may be configured on a single device.

The QoS server 12 collects the traffic data measured by the IP meter 11, and calculates traffic characteristics of the network 10, such as delay time, packet loss, and maximum data transfer volume per unit of time, and jitter (delay time dispersion).

The SL management server 13 determines based on the calculated result from the QoS server 12, whether or not the traffic characteristics of the network 10 satisfy the service level relating to the user request 51, which will be described below. Then, if necessary, the SL management server notifies a user of the determination result and the like.

The task distributor 15 receives the user request 51 that was described about service level, and selects the IP meter 11 to carry out the measurement. The task distributor 15 generates measurement rules and the like based on the service level relating to the user request, and notifies the IP meter 11 having been selected, the QoS server 12 and the SL management server 13 of the measurement rules and the like thus generated.

The task distributor 15 comprises a request receiving module 101, a measurement task derivation module 102, a task generating module 103, a task distribution module 104, a communication module 105, a meter monitoring module 106, a reaction module 107 and a group of databases 108. The task distributor 15 may be configured based on software, for example, in a personal computer, a workstation and the like. Alternatively, it may be configured with hardware having respective functions.

The request receiving module 101 receives the user request 51, and notifies the measurement task derivation module 102 of the reception.

In the present embodiment, the user request 51 includes information regarding a user who makes the request, and information regarding a service level thus requested.

The information regarding the user who makes the request can be a user identifier for identifying the user who has made the request. The information regarding the requested service level further includes information regarding the traffic characteristic to be measured, such as path information (e.g., terminal A→terminal B and so on), measurement types (e.g., delay time, packet loss, throughput and so on), and monitoring information such as allowable threshold (e.g., within 10 milliseconds and so on) of the service level and a measurement time (start time, end time and so on). A format of the user request 51 is defined in advance.

Figure 2:
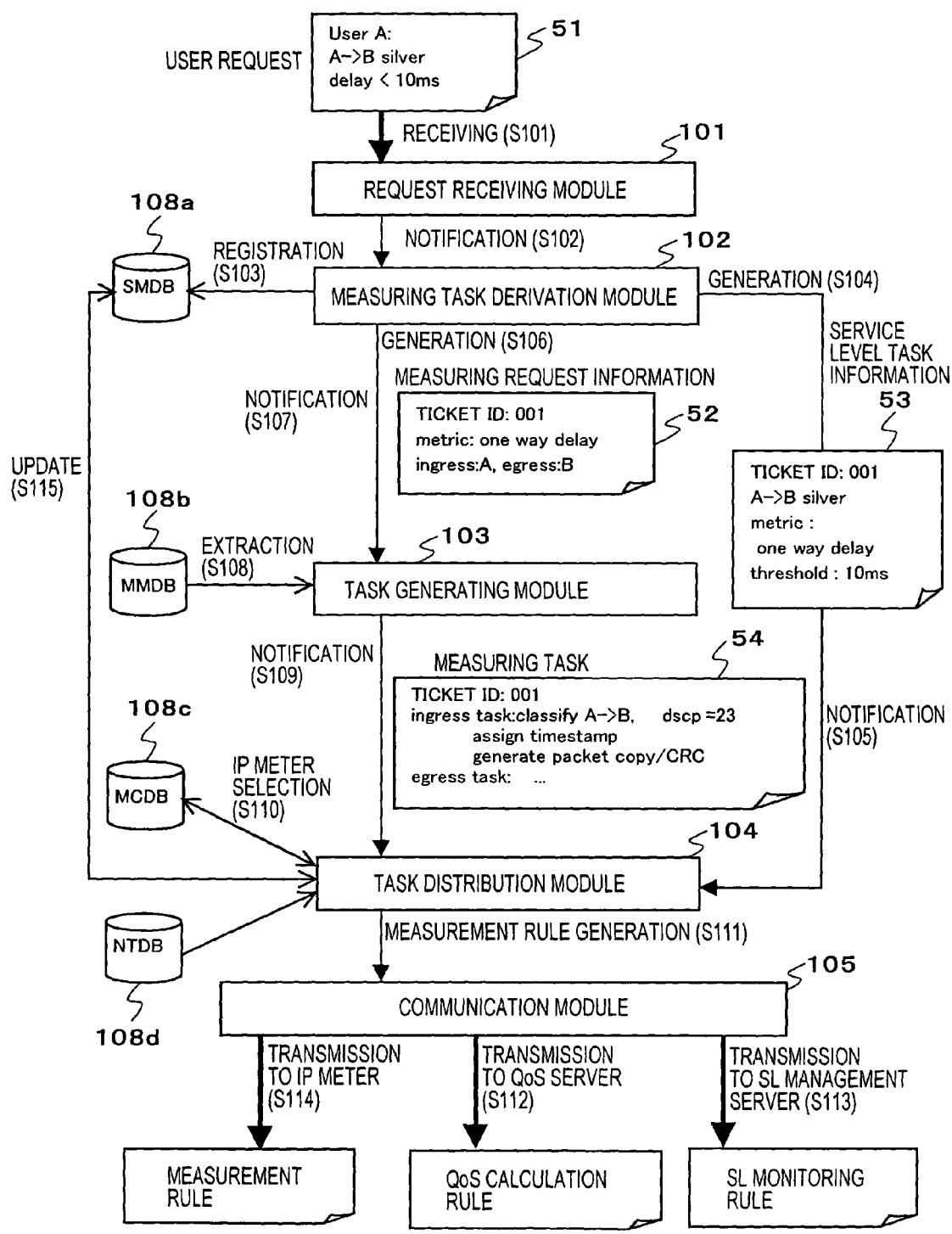
FIG. 2 is a diagram for explaining processing operations of each module of a task distributor 15, upon receipt of a user request 51.

The measurement task derivation module 102 extracts from the user request 51 thus received, information regarding the service level, and generates measurement request information 52 for calculating traffic characteristics, and service level task information 53 for monitoring the service level (see FIG. 2).

The task generating module 103 determines a task to be performed in the IP meter 11 and the QoS server 12, so as to calculate traffic characteristics required for monitoring the service level relating to the user request 51.

The task distribution module 104 specifies an IP meter 11 to perform the traffic measurement, and generates a measurement rule to be set in the IP meter 11 thus specified.

The communication module 105 controls a communication between the task distributor 15 and IP meter 11, the QoS server 12 and the SL management server 13.

The meter monitoring module 106 monitors a status of the IP meter 11.

When a trouble occurs on the IP meter 11, the reaction module 107 allows another IP meter 11 to carry out an alternative measurement.

The group of databases 108 stores information to be used in the task distributor 15. In the present embodiment, the group of databases 108 includes a service management database (SMDB) 108a, a measurement characteristic database (MMDB) 108b, a meter information database (MCDB) 108c and a network architecture management database (NTDB) 108d.

The service management database 108a is a database to manage information per user request 51. FIG. 3 is a diagram showing an example of a data structure of the service management database 108a. As shown in FIG. 3, the service management database 108a manages user information data 301, including request identifier 302, user identifier 303, measurement rule identifier 304, QoS calculation identifier 305, start time 306, end time 307 and requesting status 308.

The request identifier 302 is to identify the user request 51.

The user identifier 303 is to identify the user who made the request.

The measurement rule identifier 304 is to identify a measurement rule to be set in the IP meter 11 based on the user request 51.

The QoS calculation identifier 305 is to identify a QoS calculation rule to be set in the QoS server 12 based on the user request 51.

The start time 306 and the end time 307 respectively indicate a start time and an end time for carrying out the measurement based on the user request 51.

The requesting status 308 indicates a status of the QoS analysis system 100 regarding the user information data 301, in response to the user request 51. For example, a status of a QoS analysis system may be, for example, "on receiving request", "end of receiving", "on starting measurement" and "on ending measurement" and the like.

The measurement characteristic database 108b is a database which associates each measurement type with a necessary number of IP meters (including types), a task in the IP meter 11, and a task in the QoS server 12. FIG. 4 is a diagram showing an example of the measurement characteristic database 108b. As shown in FIG. 4, the measurement characteristic database 108b manages in a table format (measurement means table) 401, measurement type 402, number of IP meters to be used 403, IP meter task 404, and QoS server task 405.

For example, in measurement a packet size and a number of packets (VOLUME) as one type of measurement, there are provided tasks of the IP meter 11, i.e., a method for calculation by the IP meter 11 itself (VOLUME_CALC_ON_METER) and a method for transferring the captured packet, as it is, to the QoS server 12 (PACKET_COPY) or transferring the captured packet after condensed (CRC_CONDENSE). When the calculation is performed on the IP meter 11, a task on the QoS server 12 is not necessary, since the QoS server 12 is capable of using the resulted information as it is (NONE). In the other cases, the QoS server 12 performs a task to measure byte size information and packet number information by use of the packet thus transferred (VOLUME_CALCULATION).

The measurement means table 401 is generated by an administrative operator in advance, and it is stored in the measurement characteristic database 108b.

The meter information database (MCDB) 108c is a database to manage information regarding the IP meter 11 included in the network 10. FIG. 5 is a diagram showing an example of a data structure of the meter information database 108c. As shown in FIG. 5, the meter information database 108c manages IP meter information 501, including IP meter identifier 502, IP address 503, port number 504, monitoring segment 505, measurement characteristic 506, time synchronism 507, maximum number of rules 508, current number of rules 509, IP meter status 510, and last update date and time 511.

The IP meter identifier 502 is to identify the IP meter 11.

The IP address 503 is an IP address of the IP meter 11, which is used when the task distributor 15 transmits a command and the like to the IP meter 11.

The port number 504 is a port number on the IP meter 11, so as to receive a command and the like from the task distributor 15.

The monitoring segment 505 indicates a network segment, as to which the IP meter 11 is capable of performing the traffic measurement.

The measurement characteristic 506 indicates a task which the IP meter 11 is capable of performing. For example, if (VL_CALC_ON_METER) is included, the IP mater 11 is capable of calculating statistical information, and if (CRC_CONDENSE) is included, the IP meter is capable of providing packet information of condensed type.

The time synchronism 507 indicates an existence or non-existence of a time synchronizing means and accuracy in synchronism on the IP meter 11.

The maximum number of rules 58 indicates maximum number of rules acceptable by the IP meter 11, and the current number of rules 509 indicates the number of rules which is currently used for carrying out the measurement by the IP meter 11.

The IP meter status 510 indicates a current status of the IP meter 11. In the present embodiment, the IP meter 11 can be in any one of the statuses, i.e., normally activated (NORMAL), CPU usage rate in the IP meter 11 becomes high (WARNING), and the IP meter 11 is not activated (DOWN).

The last update date and time 511 indicates a date and time when the current number of rules 509 or the IP meter status 510 is updated.

In the meter information database 108c, the administrative operator stores in advance the IP meter identifier 502, IP address 503, port number 504, monitoring segment 505, measurement characteristic 506, time synchronism 507 and the maximum number of rules 508. As to the IP meter status 510, the meter monitoring module 106 periodically inquires the IP meter 11 and updates the IP meter status as necessary.

The meter information database (MCDB) 108c is provided with a measurement rule management table (not shown) for storing the measurement rule data to be set in the IP meter 11, separately from the IP meter information 501. A format of the measurement rule data which is stored in the measurement rule management table will be described below.

The network architecture management database 108d is a database to manage configuration information of the network 10. The network architecture management database 108d holds relationships in connection, for example by unit of segment, thereby managing the configuration information of the network 10. Further, the network architecture management database 108d also manages, directly or indirectly, the identifier, IP address and relationships in connection of each terminal 20 included in the network. The configuration information of the network 10 that network architecture management database 108d manages can be obtained from the network controller.

It is to be noted that the group of databases 108 is capable of storing another type of data, if necessary, without being limited to the data as described above.

Next, with reference to FIG. 2, processing operations of each module of the task distributor 15 upon receipt of the user request 51 will be explained.

This process starts when the request receiving module 101 receives the user request 51 (S101).

The request receiving module 101 notifies the measurement task derivation module 102 of the user request 51 thus received (S102).

When the measurement task derivation module 102 receives the user request 51, it registers user information data 301 based on the user request 51 in the service management database 108a (S103). Specifically, an identifier is set to the received user request 51, and it is stored in the request identifier 302. Then, the measurement task derivation module 102 sets user information based on the user identifier of the received user request 51, and sets the start time and end time based on the information regarding the service level. If the request is continuous, a value indicating "continuation" is set in the end time 307. Then, the requesting status 308 is set as "on receiving request (ON_GOING)". At this stage, there is no setting as to the measurement rule identifier 304, and the QoS calculation identifier 305.

Next, the measurement task derivation module 102 extracts from the received user request 51, information regarding the service level, and generates service level task information 53 for monitoring the service level. (S104). For example, if the information regarding the service level has a meaning that "delay time from terminal A to terminal B is within 10 milliseconds", information meaning that "monitoring to keep the resulted value by delay time measurement is to be within the 10 milliseconds" is set as the service level task information 53. Then, the measurement task derivation module 102 notifies the task distribution module 104 of thus generated service level task information 53 (S105). At this timing, the request identifier 302 is included and also notified. A rule for generating the service level task information 53 from the information regarding the service level and a format of the service level task information 53 are defined in advance.

The measurement task derivation module 102 extracts from the received user request 51 information regarding the service level, and generates measurement request information 52 for calculating the traffic characteristic (S106). For example, if the information regarding the service level has a meaning that "delay time from terminal A to terminal B is within 10 milliseconds", information meaning that "measurement from terminal A to terminal B (path information) relates to delay time measurement (measurement type)" is set as the measurement request information 52. Then, measurement task derivation module 102 notifies the task generating module 103 of the measurement request information 52 thus generated (S107). At this timing, the request identifier 302 is included and also notified. A rule for generating the measurement request information 52 from the information regarding the service level and a format of the measurement request information 52 are defined in advance.

The task generating module 103 having received the measurement request information 52 refers to the measurement characteristic database 108b, and extracts the number of IP meter 11 prepared for the measurement type included in the measurement request information 52, a task in the IP meter 11, and a task in the QoS server 12 (S108). Then, the task generating module 103 notifies the task distribution module 104 of the information obtained by adding those results above to the measurement request information 52, as a measurement task 54 (S109).

The task distribution module 104 refers to the meter information database 108c and the network architecture management database 108*d* based on the measurement task 54 received from the task generating module 103, and selects an IP meter 11 which performs the traffic measurement (S110).

Specifically, the task distribution module 104 identifies a segment including a point to be measured based on the path information in the measuring task 54 and the network architecture management database 108*d*, and extracts an IP meter 11 which is capable of measuring traffic of the identified segment from the meter information database 108*c*.

In addition, it is determined whether or not the IP meter 11 thus extracted is able to perform the task of the IP meter 11 indicated in the measurement task 54, referring to the measurement characteristic 506 and time synchronism 507 of the meter information database 108*c*. For example, in order to measure the delay time (ONE WAY DELAY) as a measurement type, it is necessary that the IP meter 11 thus extracted is provided with the time synchronizing means and is able to perform a task to condense and transfer a packet (CRC_CONDENSE). The task distribution module 104 determines whether or not the extracted IP meter 11 satisfies the rules above.

Then, the task distribution module 104 refers to the meter information database 108*c*, and confirms whether or not the current number of rules 509 in the extracted IP meter 11 is equal to or less than the maximum number of rules 508.

If the measurement characteristic and the like do not satisfy the request of the measurement task 54, or the current number of rules 509 is identical to the maximum number of rules 508, it is determined that the pertinent IP meter 11 is incapable of measurement, and then, another IP meter satisfying the rules are searched. When it is sufficient to measure an arbitrary one point, such as the case that the measurement type is statistical data, the task distribution module 104 refers to the network architecture management database 108*d*, and obtains a segment which an end-to-end path targeted for measurement passes through. Then, an IP meter 11 which is capable of monitoring the segment is searched.

When an IP meter 11 satisfying the rules is selected, the task distribution module 104 generates a measurement rule to be set in the selected IP meter 11 (S111). The measurement rule thus generated is stored in the measurement rule management table in the meter information database 108*c*. When any IP meter 11 satisfying the rules cannot be selected, a user or a higher level application is notified of the result as error information.

Figure 6:
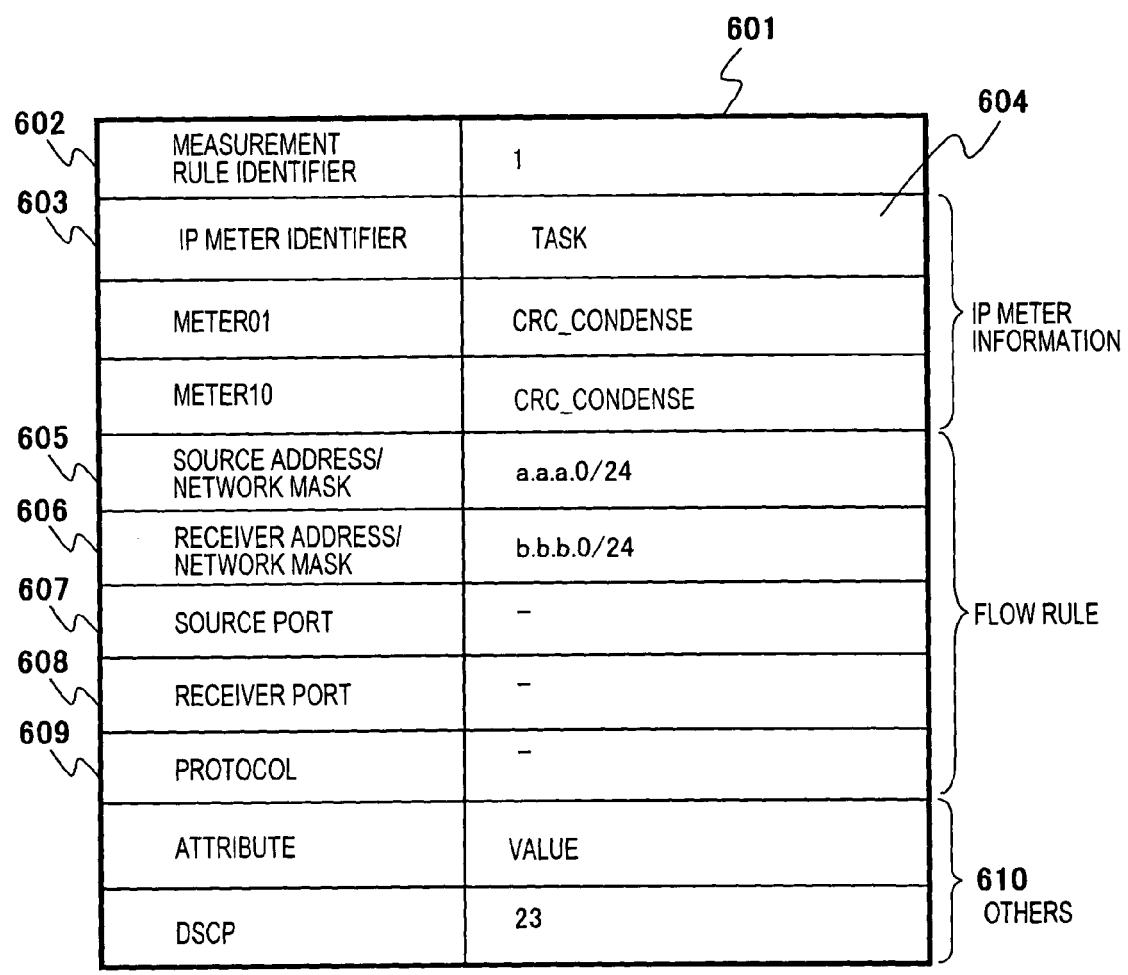
FIG. 6 is a diagram showing a data structure of a measurement rule 601, which is to be set in the IP meter 11.

FIG. 6 is a diagram showing an example of a data structure of the measurement rule 601, which is to be set in the IP meter 11. As shown in FIG. 6, the measurement rule 601 comprises, a measurement rule identifier 602 which is an identifier to identify a measurement rule uniquely and is set by the task distribution module 104, IP meter information indicating information regarding the IP meter 11 which captures a packet, a flow rule which is a filtering rule to perform filtering on the captured packet, and others 610 for storing the information that there are any other filtering rules.

The IP meter information comprises IP meter identifier 603 and task 604. The IP meter identifier 603 is an identifier of the IP meter targeted for setting the measurement rule, and has a common value with the one stored in the IP meter identifier 502 of the IP meter information 501. The task 604 indicates a task that IP meter 11 is to perform.

In a flow rule to determine a packet to be captured, source address/network mask 605 stores an address or a range of address of the source. The receiver address/network mask 606 stores an address or an address range of the receiver. Source port 607 stores a port number which is used by the terminal at the source. Receiver port 608 stores a port number which is used by the terminal at the receiver. The protocol 609 stores a protocol type of IP in higher level.

If there is any other filtering rule than the flow rule above, the information of such filtering rule is stored in the others 610. As to this flow rule, it is not necessary to store all the information of the rules, only partial rules are stored as necessary, based on the path information for measurement, which is specified in the user request 51.

When the measurement rule 601 is generated, the task distribution module 104 utilizes the communication module 105, and firstly, transmits a QoS calculation rule to the QoS server 12 (S112). Here, the QoS calculation rule includes, for example, the measurement rule identifier 602 set in the measurement rule 601, and the address of the selected IP meter 11, the measurement type and the task of the QoS server. When this QoS calculation rule is normally received by the QoS server 12, QoS calculation identifier is notified from the QoS server 12.

Next, the task distribution module 104 transmits SL monitoring information to the SL management server 13 (S113). Here, the SL monitoring rule includes, for example, a QoS calculation identifier notified from the QoS server 12 and monitoring information of the service level task information 53 notified from the measurement task derivation module 102.

The task distribution module 104 then transmits a measurement rule 601 to each of the selected IP meters 11 (S114). At this stage, if the measurement uses IP meters at two points, such as measurement delay time or packet loss, the measurement rule 601 is firstly set on the IP meter 11 which is close to the receiver terminal. Subsequently, the measurement rule 601 is set to the IP meter which is close to the source terminal.

When the above transmission is successfully completed, the task distribution module 104 stores the measurement rule identifier and the QoS calculation identifier thus received, in the measurement rule identifier 304 and the QoS calculation identifier 305 respectively, of corresponding user information data 301 in the service management database 108*a*. Then, the requesting status 308 of the user information data 301 is updated to "end of receiving" (S115).

Further, the task distribution module 104 updates the current number of rules 509 in the corresponding IP meter information 501 in the meter information database 108*c*.

According to the processes above, the task distributor 15 is able to select an IP meter 11 for measurement the network traffic based on the user request 51, and set therein a measurement rule.

Figure 7:
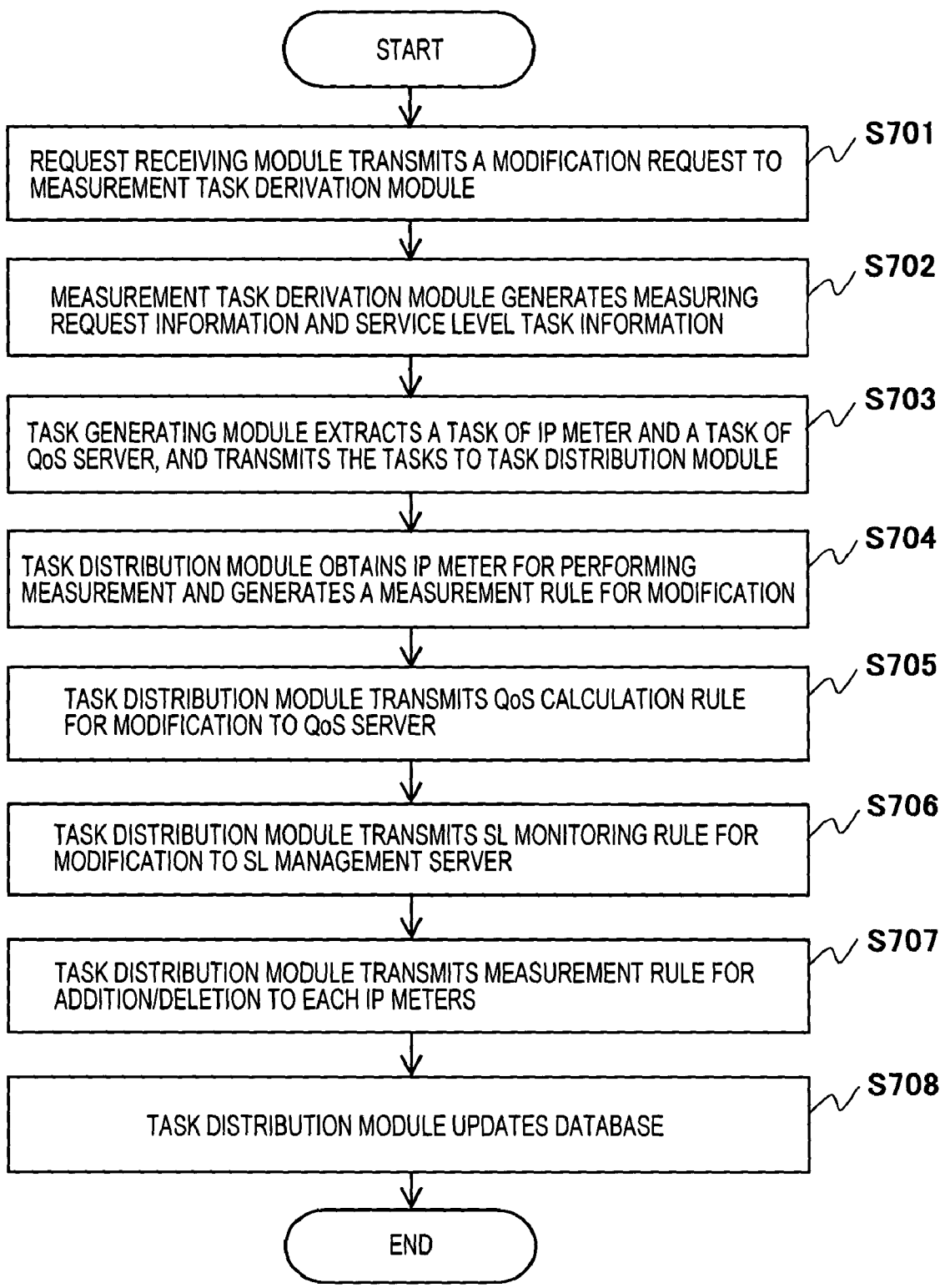
FIG. 7 is a flowchart for explaining processing operations of each module of the task distributor 15, when the already-set user request 51 is modified.

Next, processing operations of each module of the task distributor 15 in the case where the already-set user request 51 is modified will be explained with reference to the flowchart of FIG. 7.

When the request receiving module 101 receives a modifying request, the measurement task derivation module 102 is notified of the information (S701). The modifying request 58 includes a request identifier 302 of the user information data 301 to be modified, and based on this request identifier 302, the measurement task derivation module 102 extracts the pertinent user information data 301 from the service management database 108*a*. Then, the measurement task derivation module 102 generates measurement request information 52 and service level task information 53 (S702).

The measurement task derivation module 102 transmits the measurement request information 52 and the service level task information 53 thus generated to the task generating module 103 and the task distribution module 104, respectively. Further, the measurement task derivation module 102 notifies the task generating module 103 of the measurement rule identifier 304 included in the user information data 301, and notifies the task distribution module 104 of the QoS calculation identifier 305.

The task generating module 103 which has received the measurement request information 52 refers to the measurement characteristic database 108b, and extracts the number of the IP meter 11 corresponding to the measurement type included in the measurement request information 52, a task in the IP meter 11 and a task in the QoS server 12. Then, the task generating module 103 notifies the task distribution module 104 of the information as measurement task 54, obtained by adding to the measurement request information 52, the resulting information above and the measurement rule identifier 304 (S703).

The task distribution module 104 extracts a current measurement rule data, based on the received measurement rule identifier 304, from the measurement rule management table in the meter information database 108c. Then, the task distribution module 104 compares the measurement rule data thus extracted with a measurement rule based on a new task. Consequently, if the measurement rule based on the new task is different from the already-set measurement rule data, a measurement rule deleting command is generated. For example, if a measurement of a path from terminal A to terminal B is modified to a measurement of a path from terminal A to terminal C, one of the IP meters 11 for performing the measurement is replaced. At this stage, a measurement rule for the IP meter 11 for performing the measurement on the newly added terminal C is generated, as well as generating information for deleting the measurement rule, for the IP meter 11 which is subjected to the modification. (S704).

The task distribution module 104 firstly transmits a QoS calculation rule for the modification to the QoS server 12 (S705). The QoS calculation rule includes a QoS calculation identifier for the modification, as well as information identical to the rule at the time of initial setting.

When the QoS server 12 normally receives the modification request, the task distribution module 104 notifies the SL managing server 13 of an SL monitoring rule (S706). The SL monitoring rule includes a QoS calculation identifier and monitoring information and the like, which are obtained from the service level task information 53, transmitted from the measurement task derivation module 102.

Then, the task distribution module transmits a measurement rule to be added/deleted to each of the IP meters 11 (S707).

If the data transmission as described above is successfully completed, the task distribution module 104 deletes the measurement rule data prior to the modification in the measurement rule management table in the meter information database 108c, and stores the measurement rule data after the modification. Then, a requesting status 308 of the user information data 301 is updated to "end of receiving" (S708). Further, the task distribution module 104 updates a current number of rules 509 in the corresponding IP meter information 501 in the meter information database 108c.

The operations as described above are the processing operations of each module of the task distributor 15 at the time when a modification is made to the already-set request.

Figure 8:
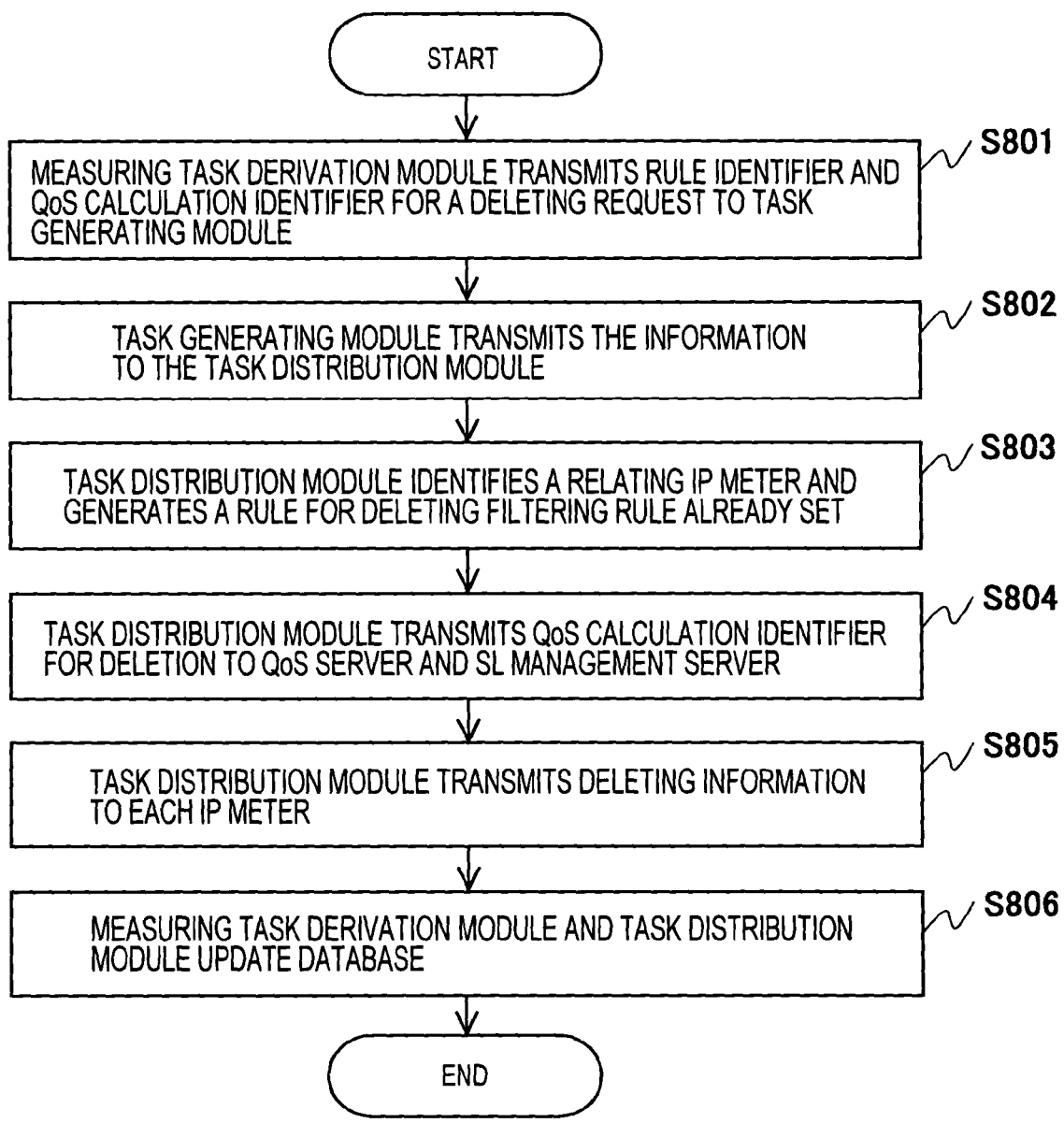
FIG. 8 is a flowchart for explaining processing operations of each module of the task distributor 15, when the already-set user request 51 is deleted.

Next, processing operations of each module of the task distributor 15 when the already-set user request 51 is deleted will be explained with reference to a flowchart in FIG. 8.

When the measurement task derivation module 102 receives a deleting request from the request receiving module 101, it extracts corresponding user information data 301 based on the request identifier. Then, a measurement rule identifier 304 and a QoS calculation identifier 305 are obtained from the user information data 301, and the measurement task derivation module 102 notifies the task generating module 103 of the obtained information (S801).

The task generating module 103 does nothing, and notifies the task distribution module 104 of the obtained information as it is (S802).

The task distribution module 104 specifies a corresponding IP meter 11 based on the measurement rule identifier, and generates deleting information for deleting the already-set filtering rule (S803).

Then, the task distribution module 104 notifies the QoS server 12 and the SL management server 13 of the QoS calculation identifier for the deletion (S804) And then, it notifies each IP meter 11 of the deleting information (S805).

When all the requests are properly completed, the task distribution module 104 deletes the corresponding measurement rule data in the measurement rule management table in the meter information database 108c, and the user information data 301, and then updates the current number of rules 509 in the corresponding IP meter information 501 in the meter information database 108c (S806).

The operations as described above are processing operations of each module of the task distributor 15 at the time when the already-set request is deleted.

Finally, processing operations of each module of the task distributor 15 in the case where any problems occur on the IP meter 11 will be explained with reference to FIG. 9 and FIG. 10.

Figure 9:
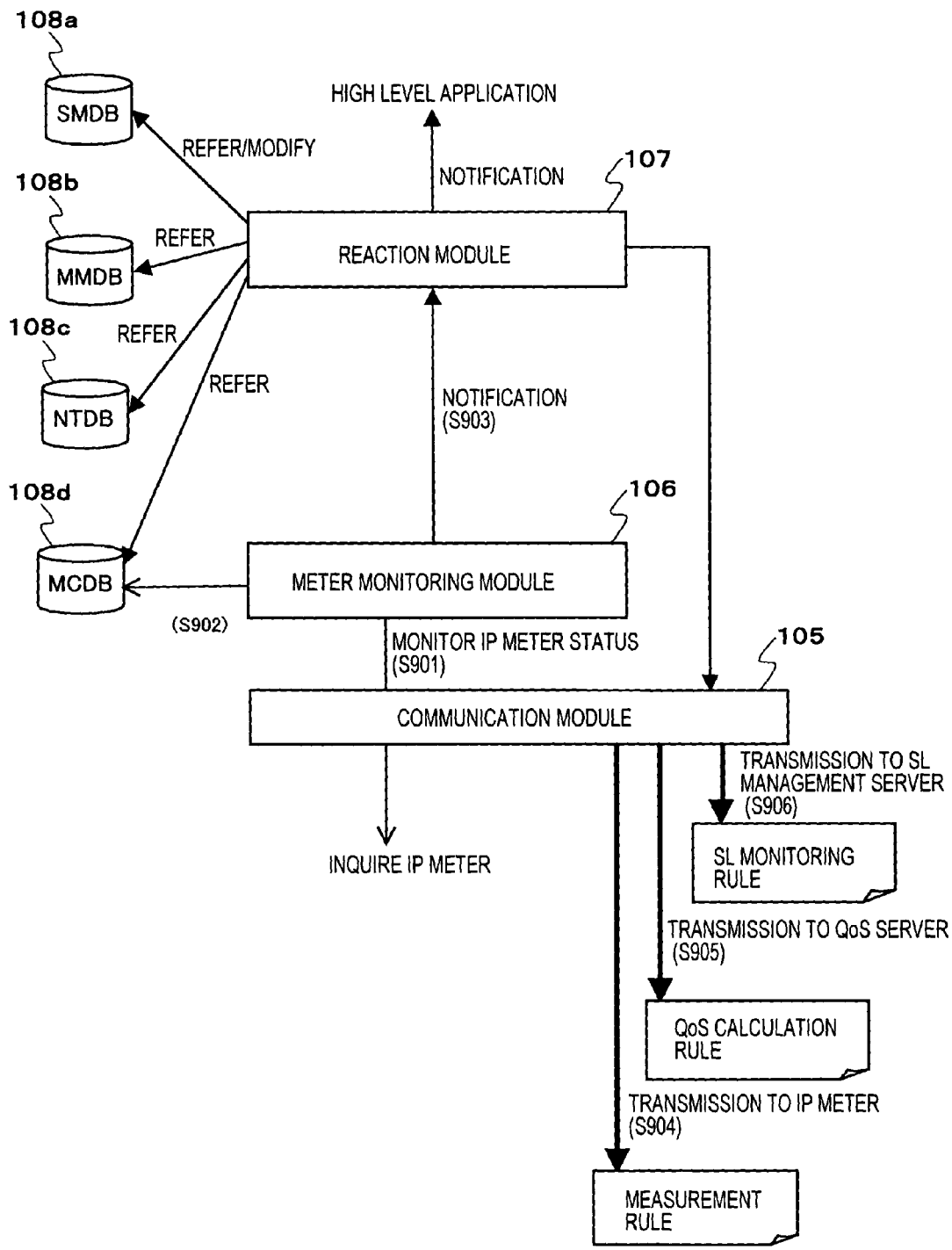
FIG. 9 is a diagram showing a process for monitoring the IP meter 11 and inter-module relationship when a problem occurs on the IP meter 11.

FIG. 9 is a diagram showing relationships among each module in the processing for monitoring the IP meter 11 and when a problem occurs on the IP meter itself.

The meter monitoring module 106 periodically inquires the IP meter 11 via the communication module about the meter status (S901). The meter monitoring module 106 updates the meter status 510 of the meter information database 108c, based on the inquiry result (S902). At this timing, if there is no response or the response in an abnormal status, the meter monitoring module 106 notifies the reaction module 107 of an alarm including the IP meter identifier on which the problem has occurred (S903).

When the reaction module 107 receives the alarm, it obtains an alternative IP meter 11 according to the procedure as described below. Then, the reaction module 107 notifies the QoS server 12 of a new QoS calculation rule (S905), also notifies the SL management server 13 of a new SL monitoring rule (S906) and adds a measurement rule to the alternative IP meter 11 (S904).

Figure 10:
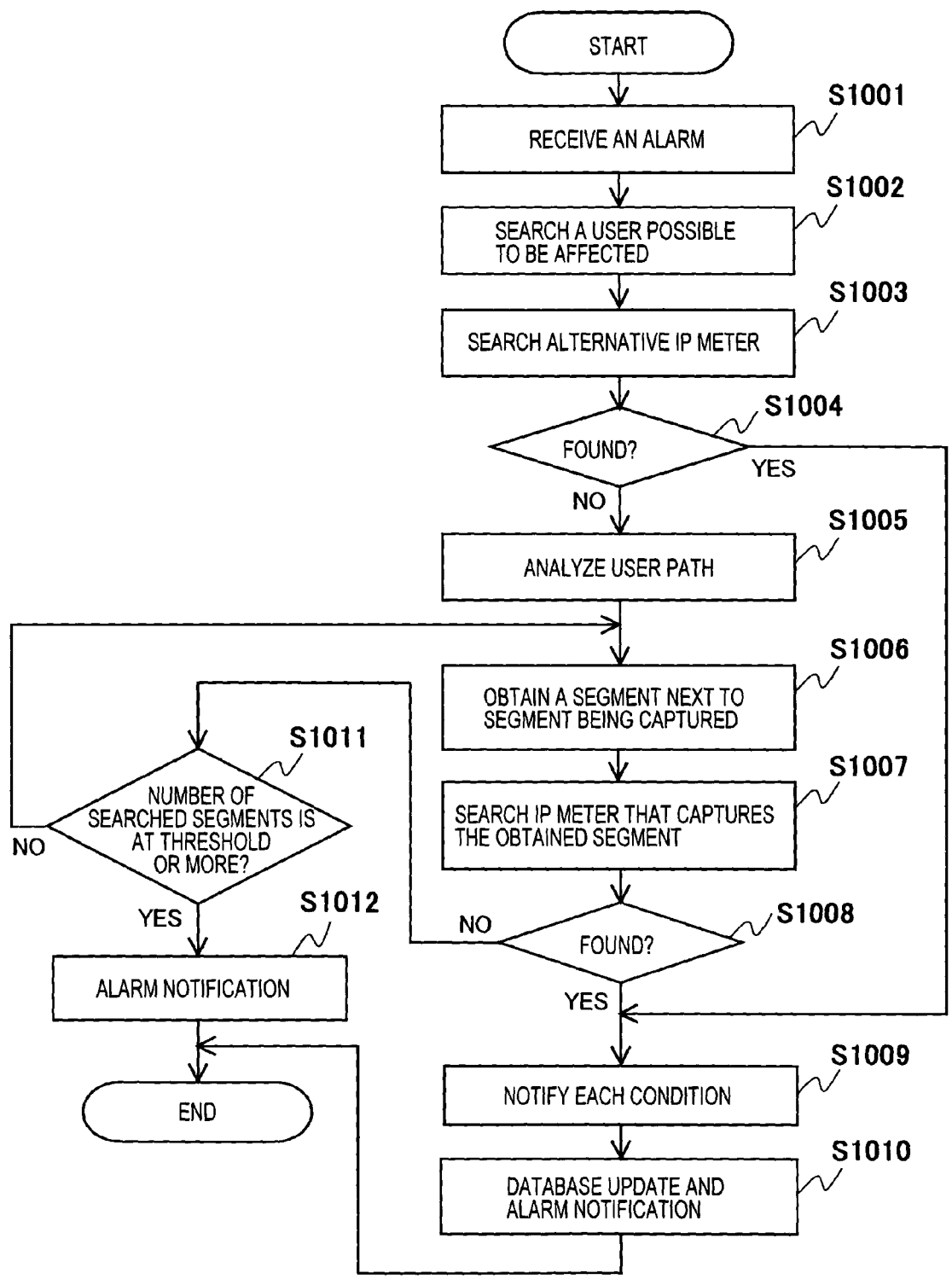
FIG. 10 is a flowchart showing a processing operation of a reaction module 107 when it is notified of alarm from a meter monitoring module 106.

FIG. 10 is a flowchart showing processing operations of the reaction module 107, at the time when it is notified of the alarm from the meter monitoring module 106.

The reaction module 107 starts this processing when it receives the alarm from the meter monitoring module 106 (S1001).

The reaction module 107 obtains a measurement rule 601 containing the corresponding identifier, from the IP meter identifiers included in the alarm. Then, based on the measurement rule identifier 602 of the measurement rule 601, user information data 301 possible to be affected is extracted from the service management database 108a (S1002).

Next, referring to the monitoring segment 505 of the meter information database 108c, a network segment monitored by the IP meter 11 having the problem is obtained.

Then, it is also checked whether or not there is another IP meter 11 which captures the same segment (S1003, S1004). If such IP meter 11 does not exist, the reaction module 107 obtains a segment constituting a path, from the path information and the network architecture management database 108d (S1005). Then, the reaction module 107 obtains a segment next to the segment which captures the IP meter 11 having the problem (S1006), and determines whether or not there is an IP meter 11 which captures the next segment (S1007, S1008).

If such IP meter 11 exists, and it is available for measurement, the reaction module notifies the QoS server 12 that information will be collected from the new IP meter 11, and also notifies the SL management server 13 that it is the measurement through an alternative path. Then, the reaction module 107 sets a measurement rule to the alternative IP meter 11 (S1009). When the processing above is normally completed, the IP meter identifier in the corresponding measurement rule data in the measurement rule management table in the meter information database 108 is replaced by the identifier of the alternative IP meter 11.

Subsequently, the reaction module 107 sends a warning notification as to the change in the measurement rule, to the higher level application (1010).

On the other hand, if any IP meter 11 available for measurement does not exist, the reaction module 107 searches another adjacent segment on the path, and repeats a process to find whether or not any available IP meter 11 exists (S1011 ... S1008). Then, if the number of the segments thus searched reaches a threshold or more, the process is stopped and the reaction module 107 sends to the higher level application an alarm notification indicating that the alteration is unsuccessful (S1012).

According to the processes above, the task distributor 15 automatically selects an IP meter 11 relating to the measurement based on the user request, and is capable of setting measurement rules and the like in the IP meter 11, QoS server 12 and the SL management server 13.

As described above, according to the present invention, a network measurement configuration apparatus is provided, which selects an IP meter for measurement traffic in a network, based on a user request, and sets a measurement rule in the IP meter.

What is claimed is:

1. A network measurement configuration apparatus connected to a network having a plurality of measurement devices arranged therein, which measures traffic data flowing in a network segment and configures the network based on a measurement rule, comprising,
   a receiving means which receives a user request for a specified service level, including path information between two terminals for which the specified service level is desired,
   a measurement device information storing means which stores information indicating a process for measuring traffic data that can be executed by the corresponding plurality of measurement devices, and stores information indicating a network segment in which a measurement of traffic data can be executed by the corresponding measurement device in each of said plurality of measurement devices,
   a network configuration storing means which stores information indicating connection relationships of network segments configuring the network,
   a measurement device selecting means for specifying a network segment included in a path based on the path information included in the user request with reference to the network configuration storing means, and selecting a measurement device from the plurality of measurement devices based on the specified service level and a measurement type associated with the specified service level, the measurement type indicative of one or more tasks to be performed to measure one or more characteristics relating to the specified service level, and
   a measurement type information storage means which stores information indicating the measurement type and information indicating the one or more tasks to be performed.

2. The network measurement configuration apparatus according to claim 1, further comprising, wherein,
   said measurement device selecting means determines as said measurement device which is capable of executing the process, a measurement device which is capable of executing the process associated with the measurement type included in the user request.

3. The network measurement configuration apparatus according to claim 2, wherein,
   said measurement type information storing means further stores the measurement type and the number of the measurement devices in associated manner, and
   said measurement device selecting means selects the measurement device responsible for measurement based on the user request, the number corresponding to said number of the measurement devices associated with the measurement type included in the user request.

4. The network measurement configuration apparatus according to claim 1, wherein,
   said measurement device information storing means further stores, in each of said plurality of measurement devices, information indicating a maximum number of rules acceptable by the corresponding measurement device and information indicating number of rules which is currently set to the corresponding measurement device in association with each other, and
   said measurement device selecting means does not select as the measurement device responsible for the measurement, the measurement device to which the number of rules currently set is equal to or more than the maximum number of rules acceptable by the corresponding measurement device.

5. The network measurement configuration apparatus according to claim 1, further comprising;
   a characteristic calculating device information output means which transmits information to identify a method for calculating a value corresponding to the measurement type, to said characteristic calculating device which calculates a value corresponding to the measurement type included in the user request, based on the traffic data measured by the measurement device.

6. The network measurement configuration apparatus according to claim 5, wherein,
   a measurement rule is set in the measurement device thus selected, after the information for identifying the method for calculating a value corresponding to the measurement type is transmitted to said characteristic calculating device.

7. The network measurement configuration apparatus according to claim 1, further comprising,
   a problem determining means which determines whether or not a problem occurs in the measurement device, wherein,
   when the problem occurs in the measurement device being selected, said measurement device selecting means selects as the measurement device responsible for the measurement, instead of the measurement device being selected, other measurement device which is capable of measuring network segments included in a path indicated by path information included in a user request and is capable of executing a process which measures traffic data relating to a measuring type included in the user request, or other measurement device which is capable of measuring network segments adjacent to the network segments included in the path indicated by the path information included in the user request and is capable of executing a process which measures traffic data relating to a measuring type included in the user request.

8. A network measurement configuration apparatus according to claim 5, wherein, said user request further includes information relating to a demand for a network service quality, and further comprising a quality management server information output means which transmits information relating to the demand for the network service quality, to a quality management server which evaluates the network service quality based on the measurement type calculated by said characteristic calculating device.

* * * * *